W. K. HENRY.
DOOR CLOSER.
APPLICATION FILED MAR. 21, 1910.
962,144.
Patented June 21, 1910.
4 SHEETS—SHEET 1.
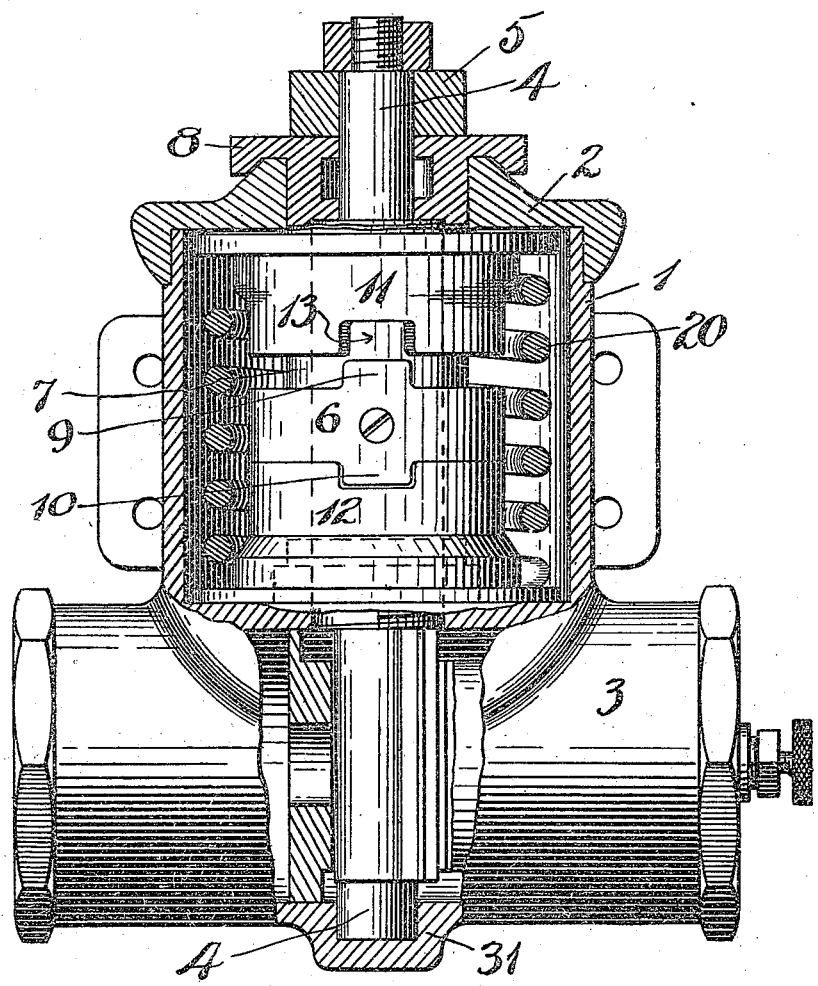

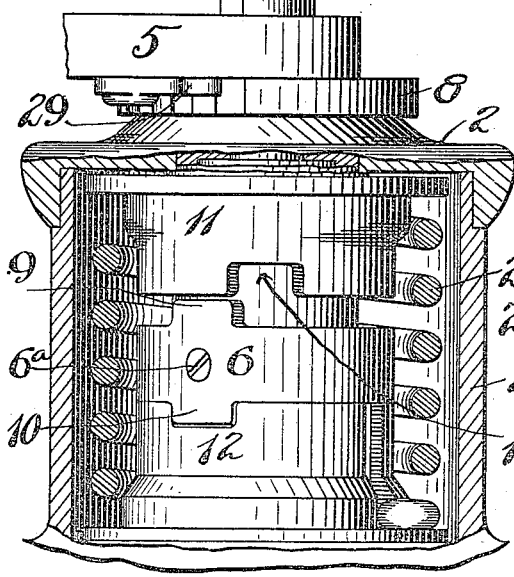
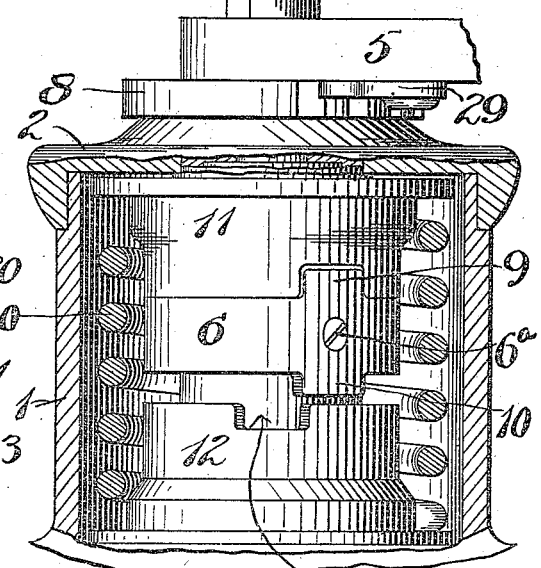
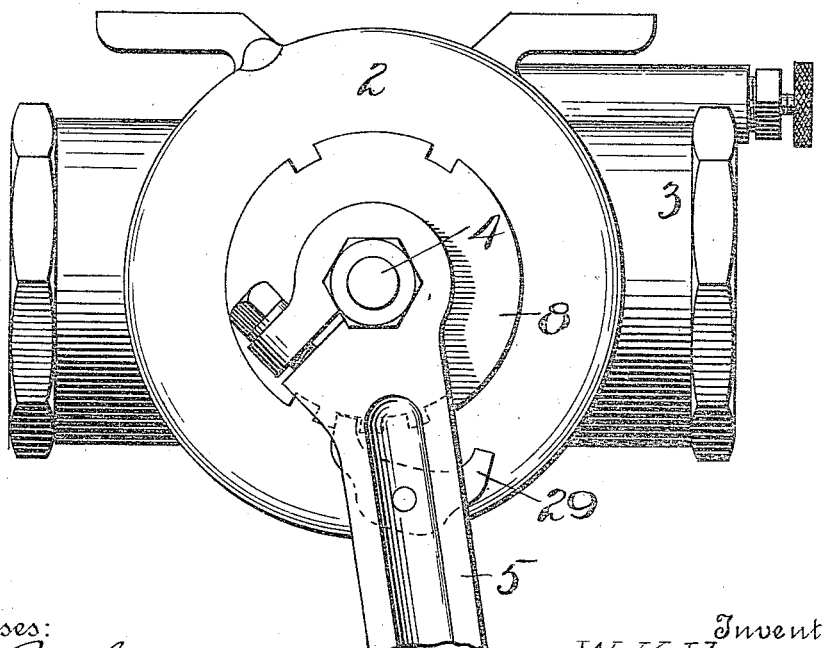

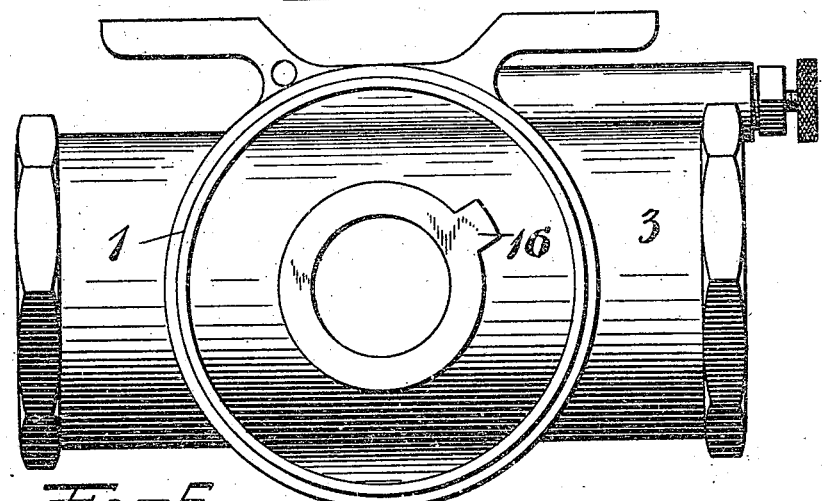
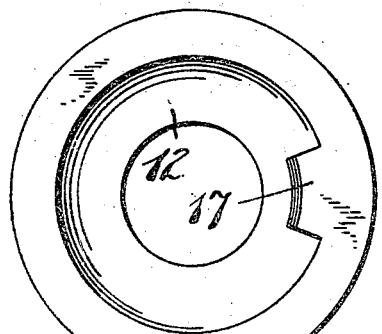
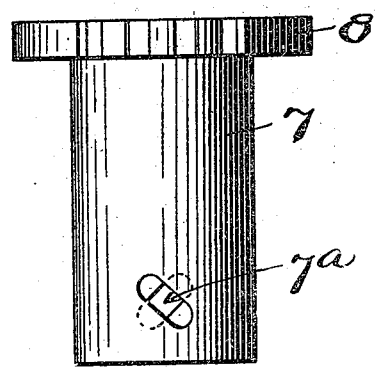
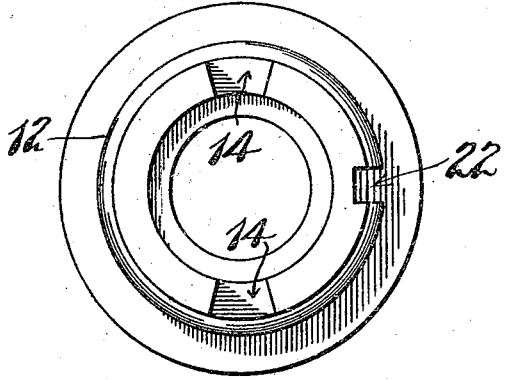
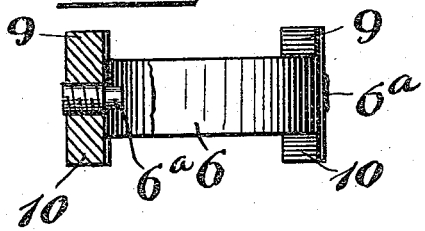

W. K. HENRY.
DOOR CLOSER.
APPLICATION FILED MAR. 21, 1910.
962,144.
Patented June 21, 1910.
4 SHEETS—SHEET 4.
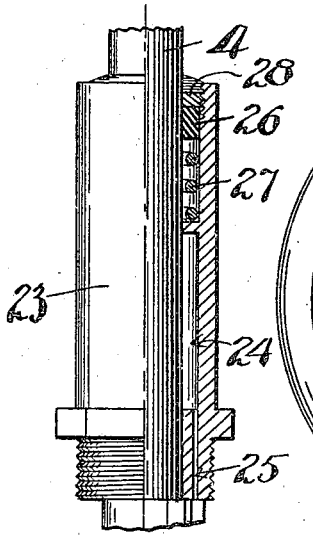
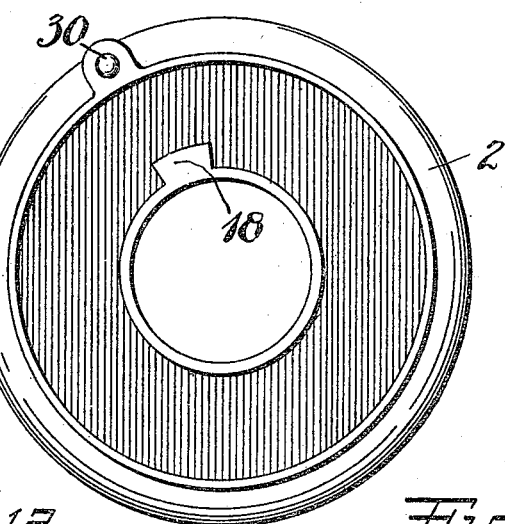
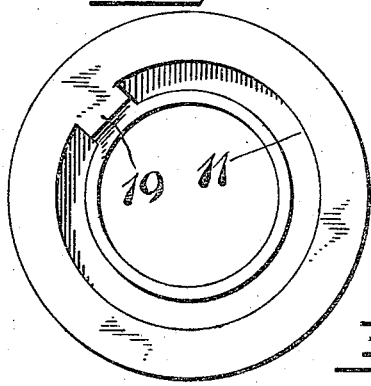
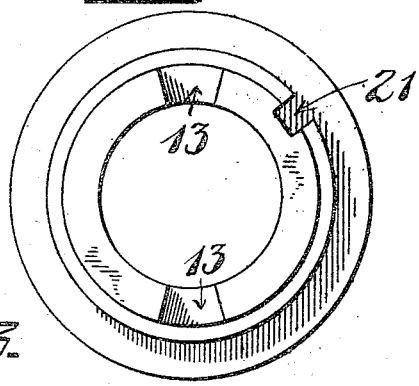
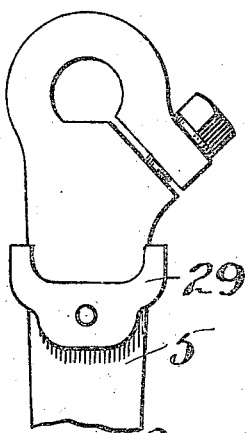
Witnesses:
Chas. A. Peair
Harry W. Conrad
Inventor
W. K. Henry
By his Attorneys

UNITED STATES PATENT OFFICE.

WILLIAM K. HENRY, OF NEW BRITAIN, CONNECTICUT, ASSIGNOR TO P. & F. CORBIN, OF NEW BRITAIN, CONNECTICUT, A CORPORATION OF CONNECTICUT.

DOOR-CLOSER.

962,144.  Specification of Letters Patent.  Patented June 21, 1910.

Application filed March 21, 1910. Serial No. 550,600.

*To all whom it may concern:*

Be it known that I, WILLIAM K. HENRY, a citizen of the United States, residing at New Britain, county of Hartford, State of Connecticut, have invented certain new and useful Improvements in Door-Closers, of which the following is a full, clear, and exact description.

My invention relates to improvements in door closers.

In the preferred form of my invention the closer is associated with door checking mechanism of any suitable construction.

The object of the invention is to improve the closer mechanism in a variety of ways, as will later be explained.

This construction contains features of improvement over the construction disclosed in my companion applications serially numbered 544,584 and 544,583.

In the drawings Figure 1 is a side elevation of a combined door closer and check, certain parts being shown in section to reveal the interior arrangement. Fig. 2 is a similar view minus the check and showing the parts in different position. Fig. 3 is a view similar to Fig. 2 but showing the parts in still another position. Fig. 4 is a plan view of the assembled mechanism. Fig. 5 is a plan view, the cap and interior movable parts of the closer being removed. Fig. 6 is a view of the under side of what I will term the lower dog. Fig. 7 is a view of the upper side of said dog. Fig. 8 is a side elevation of the clutch carrier. Fig. 9 is a side elevation of the clutch partly in section. Fig. 10 is a view of the under side of the cap for the closer case. Fig. 11 is a view of the top side of what I will term the upper dog. Fig. 12 is a view of the under side of the upper dog. Fig. 13 is a view of the under side of the lever arm. Fig. 14 is a vertical quarter-section view of what I will term the combined center support and bushing.

1 is the closer case or housing, preferably of cylindrical outline and provided with a removable cap 2.

3 is the case or housing of a door check mechanism, the same being preferably integrally formed with the case 1 and containing any suitable checking mechanism, preferably of the so-called "liquid" type.

4 is a spindle passing centrally down through the case 1 and through the partition wall at the base of the same between said case and the cylinder 3, the lower part of the spindle being suitably connected with the checking mechanism.

5 is a lever arm, such as customarily connected to the upper end of the spindle 4, and by which the closer and check is connected to a door casing, the check itself being usually connected to the door proper.

It should be understood that the apparatus is adapted to either a right or left hand door, and that when properly applied to a door, the opening and closing movement of the door imparts a swinging movement to the lever arm 5.

6 is a clutch shiftably mounted upon the sleeve 7, the upper end of the latter projecting through the cap 2 and being provided with a toothed or notched flange 8 at a point outside of the cap 2. The clutch 6 is connected to the supporting sleeve 7 by a spiral, so that when one part is rotated slightly on the other, these parts will likewise be shifted longitudinally slightly relatively to each other. In the particular construction shown, the spiral connection comprises an obliquely arranged slot $7^a$ in the clutch supporting sleeve 7, while the clutch 6 carries an inwardly projecting pin $6^a$, which stands in the slot $7^a$, whereby the aforesaid shifting movement is accomplished. The clutch 6 is provided with a suitable number of oppositely projecting lugs 9—10.

Rotatably mounted upon the clutch carrying sleeve 7 and above and below the clutch 6, are dogs 11—12 respectively. The upper dog 11 has a recess or recesses 13, arranged to receive the lug 9 on the clutch 6. The lower dog 12 has a corresponding recess or recesses 14 arranged to receive the lug or lugs 10 on the lower end of the clutch 6. The bottom of the case 1 is provided with a back stop 16, arranged eccentrically, while the under side of the lower dog 12 has a stop shoulder 17, so arranged as to engage the aforesaid back stop 16, which latter acts as a back stop to limit the rearward turning movement of the dog 12. The cap 2 is provided on its under side with a back stop 18, while the upper side of the dog 11 is provided with a stop shoulder 19, to coact with the back stop 18, which latter limits the rearward turning movement of the upper dog.

20 is a double acting coil spring, one end of which is anchored in a notch 21 in the upper dog 11, the other end being anchored in a notch 22 in the lower dog 12. The action of spring 20 is to pull the two dogs toward the two back stops 16 and 18 respectively. When the two dogs rest against these back stops, the notches 13—14 will stand one directly above the other. The spring 20 also serves as an effective means to hold the dogs 11—12 in a proper spaced relation, said dogs being spaced apart to such an extent that when the clutch 6 is in driving engagement with the lower dog, as shown in Figs. 1 and 2 for example, it will be out of driving engagement with the upper dog, this position being availed of when the check is to be used for doors swinging in one direction. When the check is to be used for a door swinging in an opposite direction, the clutch makes driving engagement with the upper dog 11, as shown in Fig. 3, in which position it has been withdrawn from driving engagement with the lower dog 12. The spacing, therefore, of these two dogs is very essential, and, as above stated, when the parts are assembled, it will be found that the spring 20 will operate as an effective device to hold said dogs apart to the proper extent, the bottom of the case 1 supporting the lower dog, the cap 2 supporting the upper dog against the expansive tendency of the spring 20.

23 is a combined center support and bushing mounted in the center of the bottom of the case 1, which serves as a partition to separate the spring chamber of the closer from the liquid chamber of the check. This center supporting sleeve performs several valuable functions. It operates as a support for the surrounding movable parts. It also provides an interior bearing support for the spindle 4. Part of the interior of the central sleeve support 23 is cut back to furnish an air space 24. 25 is a return flow duct leading from said air space back into the liquid chamber, whereby any liquid creeping up the spindle 4 into the air space 24 may return through duct 25 to the liquid checking chamber. As a further means of safety, a packing 26 held by a spring 27 against an adjustable gland 28, may also be provided. The upper end of the sleeve 23 extends practically to the upper end of the closer case, thereby providing not only a support throughout its length for the surrounding clutch and dogs, but also by reason of its abnormal and unusual length, making it impossible for any of the liquid that may be contained in the liquid checking chamber from working up into the spring chamber, a feature of recognized importance in this art.

29 is a pawl, preferably a double-ended pawl, carried on the under side of the lever arm 5 and arranged to coöperate either right or left with the clutch carrier, the nose of the pawl being adapted to engage in any one of the notches of the flange 8.

30 is a pin on the under side of the cap arranged to take into a suitable notch or perforation in the upper edge of the case 1, to hold said cap against rotation when the parts are assembled.

After the parts are assembled, the tension of the spring 20 may be varied by turning up on the flange 8, this turning movement being in the proper direction to adapt the apparatus to either a right or a left hand door. The very first turn serves to shift the clutch into driving engagement with the proper dog, the continued turning of said clutch carrier turning the dog with which the clutch is engaged in a direction to wind up the spring from that end which engages said dog, thereby increasing to the desired degree the tension in said spring. When the desired tension has been secured, the pawl 29 is turned into the notch in the flange 8 adjacent the end of the pawl and the apparatus is then ready for use.

What I claim is:

1. In a door closer, a housing a rotatable spindle, a lever arm connected thereto, a double-acting spring, a rotatable clutch, means for operatively connecting said clutch with said arm including a sleeve, one end of which projects outside of the closer housing and a spiral connection between said sleeve and said clutch whereby said last mentioned parts may partake of limited rotary and longitudinal movement relatively to each other, and means standing at opposite ends of said clutch for alternating driving engagement by the latter, the ends of said spring being respectively connected with said clutch through the medium of said means.

2. In a door closer, a housing a rotatable spindle, a lever arm connected thereto, a double-acting closer spring, a rotatable clutch, means for operatively connecting said clutch with said arm including a sleeve within said housing and projecting partly outside thereof, a connection between said sleeve and clutch whereby rotary movement of the former will first impart a limited longitudinal movement to said clutch thereon and then rotate the same therewith, and means standing at opposite ends of the clutch and arranged for alternate driving engagement therewith, the ends of said spring being respectively connected with said clutch through the medium of said means.

3. In a door closer, a housing, a rotatable spindle, a lever arm connected thereto, a double-acting closer spring, a clutch, a sleeve for operatively connecting said clutch with said arm, dogs at opposite ends of said clutch arranged for alternate driving engagement therewith, said spring being operatively connected with said dogs, the ends of said spring being alternately connected to said clutch by said dogs depending upon the position of said clutch, a back stop for each of said dogs, a single support in common to all of said parts, and separating the spindle from the balance of said parts, all of said parts being capable of rotation relatively to said sleeve, said clutch being capable of limited longitudinal movement on said sleeve, and means for shifting said clutch on said sleeve longitudinally and in a direction depending upon the direction of rotation of the sleeve relatively to the associated parts.

4. In a door closer, a housing, a central sleeve-like support mounted therein, a spindle rotatable in said sleeve-like support, a lever arm on said spindle, a sleeve rotatably mounted on the outside of said central support, and a connection between said lever arm and said sleeve, two dogs concentrically mounted relatively to said sleeve, one of said dogs being mounted directly on said sleeve, means for holding said dogs in spaced relation and for normally turning said dogs in opposite directions, a back stop for each of said dogs to limit the backward turning movement of the same respectively, a clutch mounted upon said sleeve between said dogs and capable of limited longitudinal movement thereon and means of connection between said sleeve and said clutch whereby said clutch may be shifted longitudinally on the sleeve from driving engagement with one dog into driving engagement with the other dog and vice versa depending upon the relative direction of rotation between the sleeve and clutch.

5. In a door closer, a closer housing, a central tubular support, a spindle passing through the same and rotatable therein, a sleeve mounted for rotation on the outer side of said tubular support, a clutch mounted on said sleeve, and a spiral connection between said clutch and sleeve, a dog mounted on said sleeve above said clutch, another dog mounted below said clutch, said dogs being held apart sufficiently to permit said clutch to be shifted longitudinally on its sleeve support to make driving engagement with either of said dogs, a back stop for each of said dogs, a coil spring surrounding said parts, the ends of said spring being operatively connected with both of said dogs, a lever on said spindle, means for adjustably connecting said lever to said clutch bearing sleeve.

6. In a door closer, a closer housing, a central tubular support, a spindle passing through the same and rotatable therein, a sleeve mounted for rotation on the outer side of the same, a clutch mounted on said sleeve, and a spiral connection between said clutch and sleeve, a dog mounted on said sleeve above said clutch, another dog mounted thereon below said clutch, said dogs being held apart sufficiently to permit said clutch to be shifted longitudinally on its sleeve support to make driving engagement with either of said dogs, a back stop for each of said dogs, a coil spring surrounding said parts, the ends of said spring being operatively connected with both of said dogs, a lever on said spindle, means for adjustably connecting said lever to said clutch bearing sleeve, said connecting means being adapted for either a right or left hand driving movement.

WILLIAM K. HENRY.

Witnesses:
CHAS. A. PEARDY,
IDA M. HUNZIKER.